United States Patent [19]
Schlossberg

[11] 4,155,628
[45] May 22, 1979

[54] OPTICAL MULTIPLEXER/DEMULTIPLEXER WITH INTERFEROMETER ELEMENTS

[76] Inventor: Howard R. Schlossberg, 9 Turning Mill Rd., Lexington, Mass. 02173

[21] Appl. No.: 898,068

[22] Filed: Apr. 20, 1978

[51] Int. Cl.² .......................................... G02B 27/14
[52] U.S. Cl. .................................. 350/174; 350/171
[58] Field of Search ............... 350/171, 174, 169, 163; 356/106 R

[56] References Cited

U.S. PATENT DOCUMENTS

3,879,109  4/1975  Thomas ............................. 350/174

OTHER PUBLICATIONS

App. Optics, vol. 16, No. 2, Feb. 1977, pp. 263-265.
Modern Communications Principles, Stein & Jones, pub. McGraw Hill, 1967, pp. 211-215.
A Quasi-Optical Radiometer, pp. 106-107, and Quasi--Optical Receiver Design, J. J. Gustinic, 13121 Mindanao Way, Marina Del Ray, CA. 90291.

*Primary Examiner*—Jon W. Henry
*Attorney, Agent, or Firm*—Joseph E. Rusz; Jacob N. Erlich

[57] ABSTRACT

A multiplexer/demultiplexer having a series of novel interferometer elements optically aligned with one another in a stacked relationship. Each of the interferometer elements being made up of a plurality of reflective elements forming an optical path therebetween and a pair of beamsplitters for directing a beam of radiant energy into or out of the optical path. The optical path of each interferometer element being defined for resonance at a different frequency whereby in operation as a multiplexer a plurality of beams of radiant energy, each of a predetermined frequency, emerge from the multiplexer/demultiplexer as a single beam of radiant energy having a multitude of frequencies or in operation as a demultiplexer a single beam of radiant energy having a multitude of frequencies emerges from the multiplexer/demultiplexer as a plurality of beams radiant energy, each at a preselected frequency.

10 Claims, 5 Drawing Figures

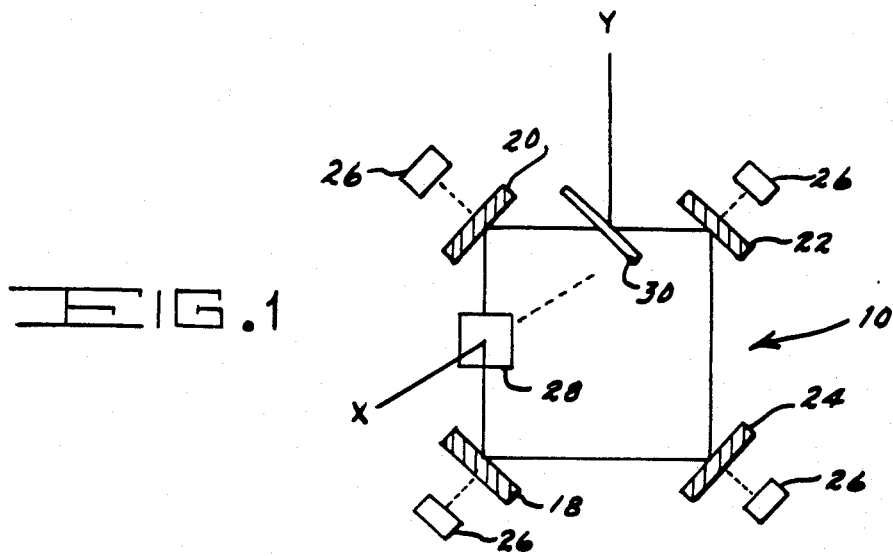
FIG.1
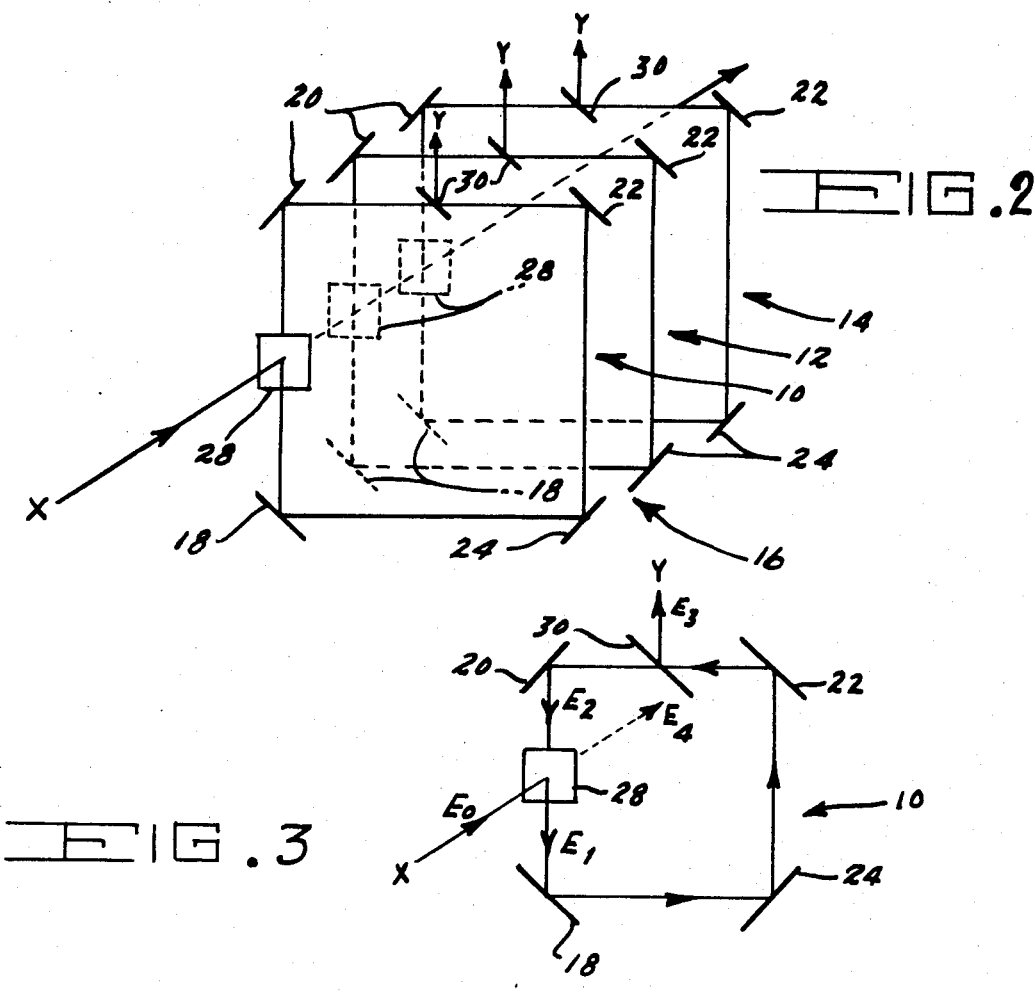
FIG.2
FIG.3

FIG. 4
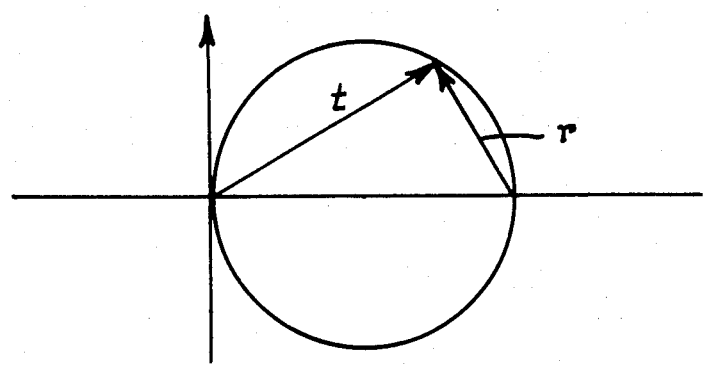
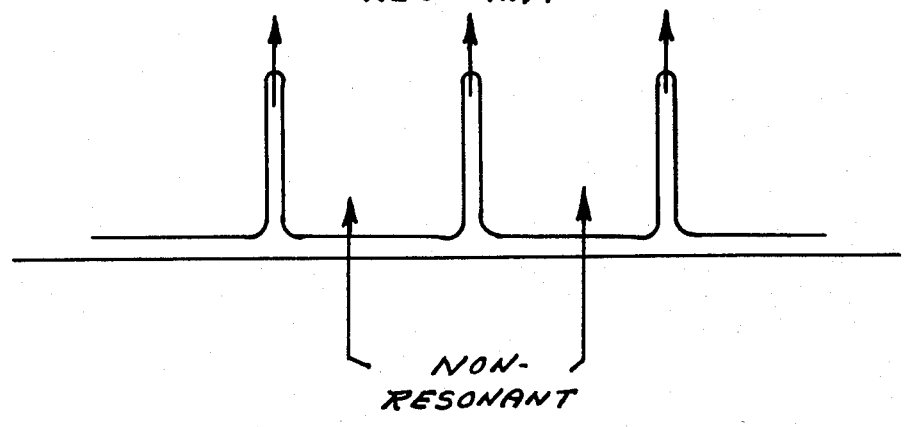
FIG. 5

OPTICAL MULTIPLEXER/DEMULTIPLEXER WITH INTERFEROMETER ELEMENTS

STATEMENT OF GOVERNMENT INTEREST

The invention described herein may be manufactured and used by or for the Government for govermental purposes without the payment of any royalty thereon.

BACKGROUND OF THE INVENTION

This invention relates generally to multiplexing systems, and, more particularly, to an improved optical multiplexer or demultiplexer.

In practice the need frequently arises for communications or reconnaissance systems which simultaneously convey multiple messages from a large number of information sources in one location to a large number of users at another location. Multiplexing systems economically meet this need by combining the messages from several information sources, which are then transmitted as a composite group over a single transmission facility, with provision at the receiver for separation (demultiplexing) back to the individual messages. Since only one transmitter and receiver is needed instead of many, one advantage of multichannel operation is a lessening of the total quantity of necessary equipment. Each of the individual streams of information that form a multiplexed group are often denoted as a channel.

There are generally two generic forms of multiplexing systems. These are frequency division multiplexing and time division multiplexing. Frequency division multiplexing is directly applicable to continuous wave form (analog) sources, in essence involving (stacking) side-by-side in frequency several information channels so as to form a composite signal. The composite frequency-multiplexed signal is then used to modulate a carrier in some conventional manner. Recovery of the individual messages after reception and initial demodulation is accomplished by bandpass filtering and frequency selection of the channels.

Time division multiplexing is a logical extension of pulse modulation, and involves interleaving in time the narrow pulses of several ordinary pulse modulation signals and thus form one composite pulse transmission system. Separation of the time multiplexed pulse streams at the receiver is accomplished by gating appropriate pulses into individual channel filters.

A third technique, phase multiplexing, is possible but appears less practical than either frequency division multiplexing or time division multiplexing. Unfortunately, the multiplexing systems of the past have been deficient in the area of low loss optical multiplexing or demultiplexing of more than two closely spaced optical frequencies.

SUMMARY OF THE INVENTION

The instant invention overcomes the problems set forth hereinabove by providing an optical multiplexer/demultiplexer which has the capability of multiplexing or demultiplexing closely spaced optical frequencies with low loss.

The multiplexer/demultiplexer of this invention is made up of a series of interferometer elements which are arranged in a stacked relationship with respect to one another to transmit either a plurality of incoming frequencies or receive a single input of various frequencies. The interferometer element are made up of four highly reflecting mirrors in optical alignment with each other and two identical beamsplitters having high transmission (greater than 98%) and absorption and scatter losses small compared to their reflectivity. In addition, the beamsplitters are optically aligned in separate segments of the interferometer element so that one deflects light out of the interferometer parallel and the other perpendicular to the plane of the path traveled within the interferometer. In this manner light may be transferred between the plurality of interferometer elements.

Each interferometer element behaves essentially as a conventional Fabry Perot resonator. For light whose wavelength is such that its optical path length around the interferometer is an integral number of times half the wavelength, the interferometer element is resonant. Light of such wavelength incident on the interferometer element at one of the beamsplitters will emerge almost entirely from the other beamsplitter and vice versa. Light whose wavelength is outside the resonances of the interferometer element incident on either beamsplitter will simply pass through the beamsplitter attenuated by $(1-T)$ or less than 2% in this case.

Each of the interferometer elements within the pluarlity of interferometer elements making up the multiplexer/demultiplexer of this invention is tuned to a different resonant frequency and the lengths and finesses are chosen so that a light frequency resonant for one interferometer element is non-resonant for all other interferometer elements within the multiplexer/demultiplexer of this invention.

As a multiplexer each novel Fabry Perot interferometer element utilized in this invention is impinged on at a beamsplitter by the frequency for which it has ben tuned to resonance. Since no two Fabry Perot interferometer elements have the same resonances, the multitude of frequencies emerge in a single beam, each frequency emerging from the other beamsplitter of the interferometer element into which it was input and passes through the other beamsplitters with low loss. As a demultiplexer the operation of the instant invention set forth hereinabove is reversed. A multitude of frequencies is input into the interferometer elements and each frequency emerges separately from the other beamsplitter of the interferometer elements with which it is resonant.

It is therefore an object of this invention to provide an optical multiplexer/demultiplexer which operates at extremely low loss.

It is another object of this invention to provide an optical multiplexer/demultiplexer which is capable of operation with more than two closely spaced optical frequencies.

It is still another object of this invention to provide an optical multiplexer/demultiplexer which is extremely effective and efficient in operation.

It is still a further object of this invention to provide an optical multiplexer/demultiplexer which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a schematic representation of one of the novel interferometer elements utilized with the multiplexer/demultiplexer of this invention;

FIG. 2 is a schematic representation of the optical multiplexer/demultiplexer of this invention;

FIG. 3 is a schematic representation of the novel interferometer element of FIG. 1 illustrating the relevant electric fields;

FIG. 4 is a complex plane representation of the equations $|t^2|+|r|^2=1$ and $t-r=1$ utilized in the description of the multiplexer/demultiplexer of this invention; and FIG. 5 is a graphic representation of the resonant frequency behavior of the interferometer elements of the multiplexer/demultiplexer of this invention.

DETAILED DESCRIPTION OF THE PREFERRED EMBODIMENT

Reference is now made to FIGS. 1 and 2 of the drawing which show a single novel interferometer element 10 and a series of such interferometer elements 10, 12 and 14, respectively, utilized in making up the optical multiplexer/demultiplexer 16 of this invention. As shown in FIGS. 1 and 2 of the drawing all interferometer elements 10, 12 and 14 of multiplexer/demultiplexer 16 are made up of identical elements arranged in juxtaposed stacked positions. For simplicity, therefore, the following description is made with reference to only one such interferometer element 10. All interferometer elements, 10, 12 and 14 as shown in FIG. 2 will therefore utilize identical numerals for the same elements thereof. In addition, any number of interferometer elements 10 may be utilized in this invention even though only three are shown in the drawing.

Still referring to FIG. 1 of the drawing, interferometer element 10 is made up of four reflecting elements preferably in the form of highly reflecting mirrors 18, 20, 22 and 24 in optical alignment with each other and arranged at the four corners of a substantially square optical configuration. Mirrors 18, 20, 22 and 24 may be fixed for a predetermined optical path length or have any conventional moving means such as electric motors 26 or the equivalent thereof attached thereto for adjusting mirrors 18, 20, 22 and 24 in a manner to be described in detail hereinbelow.

In addition to mirrors 18, 20, 22 and 24, a pair of directing means, preferably in the form of conventional beamsplitters 28 and 30, are optically interposed between mirrors 18 and 20 and mirrors 20 and 22, respectively. Beamsplitters 28 and 30 are generally made of a thin, low absorption dielectric material such as mylar. They are furthermore made to give a high transmission, low reflection (less than 2%) and absorption and scattering loss much less than the reflection. These conditions can be met by applying suitable coatings and adjusting the beamsplitter thickness if necessary. Furthermore, beamsplitters 28 and 30 are made as nearly identical as possible.

Beamsplitter 28 is located between mirrors 18 and 20 of interferometer element 10 and directs light out of or into the interferometer element 10 in a direction perpendicular to the plane of the path traveled within the interferometer element 10. Beamsplitter 30 is located between mirrors 20 and 22 and directs light out of or into interferometer element 10 in a direction parallel to the plane of the path traveled within inteferometer element 10.

An important aspect of this invention is that each interferometer element 10, 12 and 14 behaves as a conventional Fabry Perot resonator for a frequency near one of its resonance frequencies. For a more detailed explanation of such an operation reference is now made to FIG. 3 of the drawing. For this we define fields as shown in FIG. 3. Furthermore, for simplicity it is assumed each of the mirrors 18, 20, 22 and 24 is 100% reflecting and that beamsplitters 28 and 30 have no loss. Letting the amplitude transmission and reflection of beamsplitters 28 and 30 be t and r respectively, we have $$E_1 = rE_0 + tE_2 \tag{1}$$

$$E_3 = rE_1 e^{ikL_1} \tag{2}$$

$$E_2 = tE_1 e^{ikL} \tag{3}$$

$$E_4 = tE_0 + rE_2 \tag{4}$$

where $L_1$ is the longer path length between beamsplitter 28 and beamsplitter 30 and L is the total path length, then $$E_1 = rE_0 + t^2 E_1 e^{ikL} \text{ or } E_1 = (rE_0 1 - t^2 e^{ikL}) \tag{5}$$

which displays the resonance behavior of $E_1$. From (4)

$$E_4 = tE_0 + \frac{r^2 t e^{ikL}}{1 - t^2 e^{ikL}}$$

or $$E_4 = \frac{tE_0}{1 - t^2 e^{ikL}} [1 - (t^2 - r^2) e^{ikL}] \tag{6}$$

and from (2)

$$e_3 = (r^2 E_0)/1 - t^2 e^{ikL} \tag{7}$$

Now energy conservation gives $$|t^2| + |r|^2 = 1 \tag{8}$$

and Maxwell's equation gives $$t - r = 1 \tag{9}$$

Equations (8) and (9) can be depicted by the complex plane representation shown in FIG. 4. For $|t|^2 \approx 1$ and $||^2$ small it is clear from FIG. 4 that $t=|t|$ and $r=i|r|$. Hence, on resonance, ($e^{ikl}=1$) eq. 6 gives $E_4=0$ and eq. 7 gives $|E_3|^2=|E_0|^2$.

For light whose wavelength is such that its optical path (L) around the interferometer element 10 is an integral number of times half the wavelength, interferometer element 10 is resonant. Light of such wavelength (from point X, for example) incident on the interferometer element 10 at one beamsplitter, for example 28, will emerge (from point Y, for example) almost entirely from the other beamsplitter 30 and vice versa. Light whose wavelength is outside the resonances of interferometer element 10 incident on either beamsplitter 28 or 30 will simply pass through the beamsplitter attenuated by $(1-T)$ which is less than 2%. The resonance light frequencies are given by (mC/2L) where m is an integer, C is the speed of light and L is the optical path length around interferometer element 10. The width of each resonance is given by (C/2LF) where F is the interferometer finesse. The resonant frequency behavior of the interferometer element is depicted in FIG. 5 of the drawing for a high finesse.

As shown in FIG. 2 of the drawing each interferometer element 10, 12 and 14 is stacked adjacent each other having the plane of the optical path one interferometer parallel to the plane of the optical path of the others. Beamsplitter 28 of interferometer element 10 is located juxtaposed adjacent beamsplitters 28 in interferometer elements 12 and 14 while beamsplitter 30 of interferometer element 10 is located juxtaposed beamsplitters 30 of interferometer elements 12 and 14. Each of the interferometer elements 10, 12 and 14 are tuned to a different resonant frequency and the lengths and finesses are chosen so that a light frequency resonant for one interferometer element 10 is non-resonant for all other interferometer elements 12 and 14, for example.

As a multiplexer, each interferometer element 10, 12 and 14 of this invention is impinged upon at a beamsplitter 30 from point Y by the frequency for which it has been tuned to resonance. Since no two interferometer elements 10, 12 and 14 have the same resonance, the multitude of frequencies emerge in a single beam through point X, each frequency emerging from the other beamsplitter 28 of the interferometer element 10, 12 and 14, respectively, it was input to, and passing through the other beamsplitters 28 with low loss.

As a demultiplexer, the operation of the instant invention is reversed. A multitude of frequencies is input from point X and each emerges separately from the other beamsplitters 30 of the interferometer element 10, 12 or 14 with which it is resonant.

Although this invention has been described with reference to a particular embodiment, it will be understood to those skilled in the art that this invention is also capable of a variety of alternate embodiments within the spirit and scope of the appended claims.

I claim:

1. An optical multiplexer/demultiplexer comprising a series of interferoemter elements optically aligned adjacent one another, each of said interferometer elements comprising a plurality of reflective elements optically aligned with one another and forming an optical path therebetween, first means located within said optical path for directing a beam of radiant energy into or out of said optical path of said interferometer element in a direction perpendicular to a plane defined by said optical path, second means located within said optical path of said interferometer element for directing a beam of radiant energy into or out of said optical path in a direction parallel to said plane of said optical path and the total length of said optical path of each of said inteferometer elements being defined for resonance at a different frequency whereby said beam of radiant energy only at a frequency at which said interferometer element is resonant will enter said optical path of said interferometer element at one of said directing means thereof and exit said optical path at another of said directing means.

2. An optical multiplexer/demultiplexer as defined in claim 1 wherein said series of interferometer elements are optically aligned in a stacked relationship such that said planes of each of said optical paths of said interferometer elements are parallel to one another.

3. An optical multiplexer/demultiplexer as defined in claim 2 wherein said first directing means of each of said interferometer elements are located juxtaposed one another.

4. An optical multiplexer/demultiplexer as defined in claim 3 wherein said first and second directing means are beamsplitters.

5. An optical multiplexer/demultiplexer as defined in claim 4 wherein each of said interferometer elements comprises four of said reflective elements.

6. An optical multiplexer/demultiplexer as defined in claim 5 wherein said first beamsplitter is optically interposed between two of said reflective elements and said second beamsplitter is optically interposed between one of said two reflective elements and a third reflective of said reflective elements.

7. An optical multiplexer/demultiplexer as defined in claim 1 wherein said reflective elements are highly reflective and have substantially no transmission.

8. An optical multiplexer/demultiplexer as defined in claim 7 wherein said first and second directing means are each made of a low absorption dielectric material made to give high transmission, low reflection and absorption and scattering loss much less than said reflection.

9. An optical multiplexer/demultiplexer as defined in claim 8 wherein each of said interferometer elements further comprises means operatively connected to said reflective elements for adjusting the length of said optical path.

10. An optical multiplexer/demultiplexer as defined in claim 9 wherein said series of interferometer elements are optically aligned in a stacked relationship such that said planes of each of said optical paths of said interferometer elements are parallel to one another.

* * * * *

UNITED STATES PATENT AND TRADEMARK OFFICE
CERTIFICATE OF CORRECTION

PATENT NO. : 4,155,628
DATED : 22 May 1979
INVENTOR(S) : Howard R. Schlossberg

It is certified that error appears in the above-identified patent and that said Letters Patent are hereby corrected as shown below:

Column 4, line 27, "$E_1 = rE_o + t^2 E_1 e^{ikL}$ or $E_1 = (rE_o 1 - t^2 e^{ikL})$"

should read -- $E_1 = rE_o + t^2 E_1 e^{ikL}$ or $E_1 = \dfrac{rE_o}{1 - t^2 e^{ikL}}$ --.

Column 4, line 39, "$e_3 = (r^2 E_o)/1-^2 e^{ikL}$"

should read -- $E_3 = \dfrac{r^2 E_o}{1 - t^2 e^{ikL}}$ --.

Column 4, line 51, " $|\ |^2$ " should read -- $|r|^2$ --.

Signed and Sealed this

Eleventh Day of September 1979

[SEAL]

Attest:

Attesting Officer

LUTRELLE F. PARKER
Acting Commissioner of Patents and Trademarks